US009652997B2

(12) United States Patent
Oh (10) Patent No.: US 9,652,997 B2
(45) Date of Patent: May 16, 2017

(54) METHOD AND APPARATUS FOR BUILDING EMOTION BASIS LEXEME INFORMATION ON AN EMOTION LEXICON COMPRISING CALCULATION OF AN EMOTION STRENGTH FOR EACH LEXEME

(75) Inventor: Hyo Jung Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1177 days.

(21) Appl. No.: 13/592,871

(22) Filed: Aug. 23, 2012

(65) Prior Publication Data
US 2013/0052619 A1 Feb. 28, 2013

(30) Foreign Application Priority Data
Aug. 24, 2011 (KR) .................. 10-2011-0084801

(51) Int. Cl.
| G09B 19/00 | (2006.01) |
| G06F 9/44 | (2006.01) |
| G06Q 30/00 | (2012.01) |
| G06Q 30/02 | (2012.01) |

(52) U.S. Cl.
CPC ............ *G09B 19/00* (2013.01); *G06F 8/20* (2013.01); *G06Q 30/0203* (2013.01)

(58) Field of Classification Search
CPC ...... G06F 17/2795; G06Q 50/10; G09B 19/00
USPC ........................................ 717/100
See application file for complete search history.

(56) References Cited

U.S. PATENT DOCUMENTS

| 2002/0199166 A1* | 12/2002 | Volcani ............... G06F 17/2795 717/100 |
| 2009/0234718 A1* | 9/2009 | Green ................... G06Q 50/10 705/7.32 |
| 2010/0262597 A1 | 10/2010 | Han |

FOREIGN PATENT DOCUMENTS

| KR | 2000-0017788 | 4/2000 |
| KR | 10-2004-0042012 | 5/2004 |
| KR | 10-2009-0034052 | 4/2009 |
| KR | 10-2009-0080822 | 7/2009 |

OTHER PUBLICATIONS

"SentiFul: Generating a Reliable Lexicon for Sentiment Analysis", Veviarouskaya et al. IEEE 978 1-4244-4799 Feb. 2009, 2009.*

* cited by examiner

*Primary Examiner* — Farzad Kazeminezhad
(74) *Attorney, Agent, or Firm* — Staas & Halsey LLP (57) ABSTRACT

Disclosed are a method and apparatus for building information on an emotion lexicon. The method according to the disclosure may include: retrieving specific documents on the basis of a specific emotion expression lexeme to derive emotion basis lexemes of the emotion expression lexeme from sentences including the emotion expression lexeme; and deriving a new emotion basis lexeme determined among the derived emotion basis lexemes according to at least one predefined new lexeme criterion and then storing the new emotion basis lexeme in an emotion lexicon. The method may include writing emotion expression lexemes associated to the emotion basis lexemes and assigning an emotion strength to them by multiplying an emotion strength value associated with an emotion expression lexeme and a sum of weights associated with a plurality of modifiers of emotion expression lexemes.

9 Claims, 8 Drawing Sheets

EMOTION CLASSIFICATION: PLEASANTNESS, TRUST, FEAR, SURPRISE, SADNESS, HATRED, ANGER, ANTICIPATION

| SENTENCE | EMOTION |
|---|---|
| DRINKING MACALLAN ALONE | {SADNESS, 1} |
| WE ARE LIKELY TO HAVE MANY UNEXPECTED OPPORTUNITIES AROUND US TO RECEIVE FREE USEFUL INFOSHEETS! | {ANTICIPATION, 1} |
| THE TEMPERATURE HAS BEEN FLUCTUATING A LOT RECENTLY, SO BE CAREFUL NOT TO CATCH A COLD? | X |
| EARLY BIRDS HAVE IT ROUGH. | {SADNESS, 2} |
| I THINK I'M DYING. I FEEL SO ANGRY | {FEAR, 1} {ANGER, 2} |
| VERSION 13.0 OF GOOGLE CHROME DOES NOT SUPPORT details/summary TAG OF HTML5, UNLIKE VERSION 12.0 | {ANGER, 1} |
| VIOLENCE IS FOR GANGSTERS, NOT THE GOVERNMENT | {FEAR, 1} |

950

METHOD AND APPARATUS FOR BUILDING EMOTION BASIS LEXEME INFORMATION ON AN EMOTION LEXICON COMPRISING CALCULATION OF AN EMOTION STRENGTH FOR EACH LEXEME

CLAIM FOR PRIORITY

This application claims priority to Korean Patent Application No. 10-2011-0084801 filed on Aug. 24, 2011 in the Korean Intellectual Property Office (KIPO), the entire contents of which are hereby incorporated by reference.

BACKGROUND

1. Technical Field

Example embodiments of the present invention relate in general to a method and apparatus for building information on an emotion lexicon and more specifically to a method and apparatus for building information on an emotion lexicon by extracting an emotion expression lexeme and a basal lexeme for emotion expressions from a sentence which is provided through a web document, and so on.

2. Related Art

Using an emotion lexicon dictionary is one method used to analyze emotion which is expressed in a sentence. An emotion lexicon contains words or patterns for each category. Emotion information about a given text may be analyzed by determining whether a word or pattern in the text is contained in the emotion lexicon (see Korean Patent No. 2009-0034052 entitled "Apparatus and method for extracting emotion information").

This method has a problem in the method of building the emotion lexicon. Also, a method for recognizing the emotion lexicon only by determining whether a word or pattern is contained has low accuracy. In commercial services requiring high accuracy, the emotion lexicon is often built manually. The method of building the emotion lexicon manually has limitations of requiring much manpower, time, and cost.

Much research has been conducted on building the lexicon semi-automatically and automatically. A method of increasingly expanding a small number of emotion words is associated with the present invention in a methodology for semi-automatically and automatically building the emotion lexicon. For this purpose, related words (synonyms and antonyms) or relations between words in a text may be used (see Korean Patent No. 2009-0129707 entitled "Representative sensitivity vocabulary abstraction method that use sensitivity vocabulary rescue [sic]").

However, most methods thereof are shown to be useful only in limited domains such as customer reviews for movies or goods, and a methodology for effectively building the lexicon in all situations has not yet been designed.

SUMMARY

Accordingly, example embodiments of the present invention are provided to substantially obviate one or more problems due to limitations and disadvantages of the related art.

Example embodiments of the present invention provide a method of building information on an emotion lexicon, which can minimize the amount of manual work and accurately recognize emotion for sentences provided in various situations.

Example embodiments of the present invention also provide an apparatus for building information on an emotion lexicon, which can minimize the amount of manual work and accurately recognize emotion for sentences provided in various situations.

In some example embodiments, a method of building information on an emotion lexicon includes: retrieving specific documents on the basis of specific emotion expression lexemes to derive emotion basis lexemes of the emotion expression lexemes from sentences including the emotion expression lexemes; and deriving a new emotion basis lexeme, the new emotion basis lexeme being determined among the derived emotion basis lexemes according to at least one predefined new lexeme criterion and then storing the new emotion basis lexeme in an emotion lexicon.

The method may further include: retrieving specific documents on the basis of the new emotion basis lexeme to derive emotion expression lexemes related to the emotion basis lexeme from sentences including the emotion basis lexeme; and deriving a new emotion expression lexeme, the new emotion expression lexeme being determined among the derived emotion expression lexemes according to at least one predefined new lexeme criteria and then storing the new emotion expression lexeme in the emotion lexicon.

The new emotion basis lexeme determination unit may group the derived emotion basis lexemes for each emotion basis lexeme having the same meaning, rank the emotion basis lexeme groups according to the at least one new lexeme criterion, extract an emotion basis lexeme in an emotion basis lexeme group with a certain rank or higher, and store the emotion basis lexeme as the new emotion basis lexeme in the emotion lexicon in correspondence with the specific emotion expression lexeme.

The deriving of the new emotion expression lexeme may include grouping the derived emotion expression lexemes for each emotion basis lexeme having the same meaning, ranking the emotion expression lexeme groups according to the at least one new lexeme criterion, extracting an emotion expression lexeme in an emotion basis lexeme group with a certain rank or higher, and storing the emotion expression lexeme as the new emotion expression lexeme in the emotion lexicon in correspondence with the emotion basis lexeme.

The specific emotion expression lexeme may be extracted from the emotion lexicon The predefined new lexeme criterion may include at least one of the number of sentences including the lexeme, the number of documents including the lexeme, the popularity of a document containing a sentence including the lexeme, and the recognition of a web-site containing the sentence including the lexeme.

In other example embodiments, a method of building information on an emotion lexicon includes: retrieving a passage having a user's degree of emotion from a document for a user's response, the user's degree of emotion being standardized and thus digitized, to extract the emotion expression lexeme from the written sentence in correspondence with the standardized degree of emotion; and assigning an emotion strength to the extracted emotion expression lexeme with reference to the standardized degree of emotion.

The method may further include storing the emotion strength of the emotion expression lexeme in the emotion lexicon.

In still other example embodiments, an apparatus for building information on an emotion lexicon includes: an emotion lexicon including an emotion expression lexeme and an emotion basis lexeme corresponding to the emotion expression lexeme; an emotion basis lexeme derivation unit retrieving specific documents on the Web on the basis of a specific emotion expression lexeme included in the emotion lexicon to derive emotion basis lexemes of the emotion expression lexeme from sentences including the emotion expression lexeme; a new emotion basis lexeme determination unit storing a new emotion basis lexeme determined among the derived emotion basis lexemes according to a predefined new lexeme criterion, in the emotion lexicon; an emotion expression lexeme derivation unit retrieving a document on a specific web on the basis of the new emotion basis lexeme to derive emotion expression lexemes related to the emotion basis lexeme from sentences including the emotion basis lexeme; and a new emotion expression lexeme determination unit storing a new emotion expression lexeme determined among the derived emotion expression lexemes according to a predefined new lexeme criterion, in the emotion lexicon.

The new emotion basis lexeme determination unit may group the derived emotion basis lexemes for each emotion basis lexeme having the same meaning, rank the emotion basis lexeme groups according to the at least one new lexeme criterion, extract an emotion basis lexeme in an emotion basis lexeme group with a certain rank or higher, and store the emotion basis lexeme as the new emotion basis lexeme in the emotion lexicon in correspondence with the specific emotion expression lexeme.

The new emotion expression lexeme determination unit may group the derived emotion expression lexemes for each emotion basis lexeme having the same meaning, rank the emotion expression lexeme groups according to the at least one new lexeme criterion, extract an emotion expression lexeme in an emotion basis lexeme group with a certain rank or higher, and store the emotion expression lexeme in the emotion lexicon in correspondence with the emotion basis lexeme.

The predefined new lexeme criterion may include at least one of the number of sentences including the lexeme, the number of documents including the lexeme, the popularity of a document containing a sentence including the lexeme, and the recognition of a web-site containing the sentence including the lexeme.

The apparatus may further include an emotion strength assignment unit retrieving a passage in which a degree of emotion of a user is standardized and thus digitized, extracting the emotion expression lexeme from the written sentence in correspondence with the standardized degree of emotion, assigning an emotional strength to the extracted emotion expression lexeme with reference to the standardized degree of emotion, and storing the emotion expression lexeme in the emotion lexicon, in which the emotion lexicon may further include the emotion strength of the emotion expression lexeme as properties.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Since the present invention may have diverse modified embodiments, preferred embodiments are illustrated in the drawings and are described in the detailed description of the invention. However, it should be understood that the particular embodiments are not intended to limit the present disclosure to specific forms, but rather the present disclosure is meant to cover all modification, similarities, and alternatives which are included in the spirit and scope of the present disclosure. Like reference numerals refer to like elements throughout.

Relational terms such as first, second, A, B, and the like may be used for describing various elements, but the elements should not be limited by the terms. Terms are only used to distinguish one component from other components. For instance, without departing the scope of the present disclosure, a first element may be named as a second element, and similarly, a second element may be named as a first element. The term "and/or" encompasses both combinations of the plurality of related items disclosed and any item from among the plurality of related items disclosed.

It will also be understood that when an element is referred to as being 'connected to another element, it can be directly connected to the other element, or intervening elements may also be present. It will also be understood that when an element is referred to as being 'directly connected to' another element, there is no intervening elements.

In the following description, the technical terms are used only for explaining a specific exemplary embodiment while not limiting the present invention. The terms of a singular form may include plural forms unless referred to the contrary. The meaning of 'comprises' and/or 'comprising' specifies a property, a region, a fixed number, a step, a process, an element and/or a component but does not exclude other properties, regions, fixed numbers, steps, processes, elements and/or components.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

Disclosed is a concept of 2-step emotion lexeme expansion in an embodiment according to an embodiment. That is, the emotion lexeme is increasingly expanded through lexeme retrieval including a first step of retrieving a sentence including an emotion lexeme which is derived from an emotion lexicon including an initial emotion lexeme serving as a basis of the retrieval, from the Web on the basis of the emotion lexeme, deriving a lexeme that is a basis of the emotion lexeme, and storing the basis lexeme in the database, and a second step of retrieving a sentence from the Web on the basis of the emotion basis lexeme, deriving an emotion lexeme related to the emotion basis lexeme from the retrieved sentence, and storing the emotion lexeme in the database.

Hereinafter, embodiments of the present invention will be described in detail with reference to the accompanying drawings.

First, a method and apparatus for building information on an emotion lexicon according to the present invention will be described, and then a method of recognizing emotion in a sentence using the information on an emotion lexicon built according to an embodiment of the present invention will be described.

Figure 1:
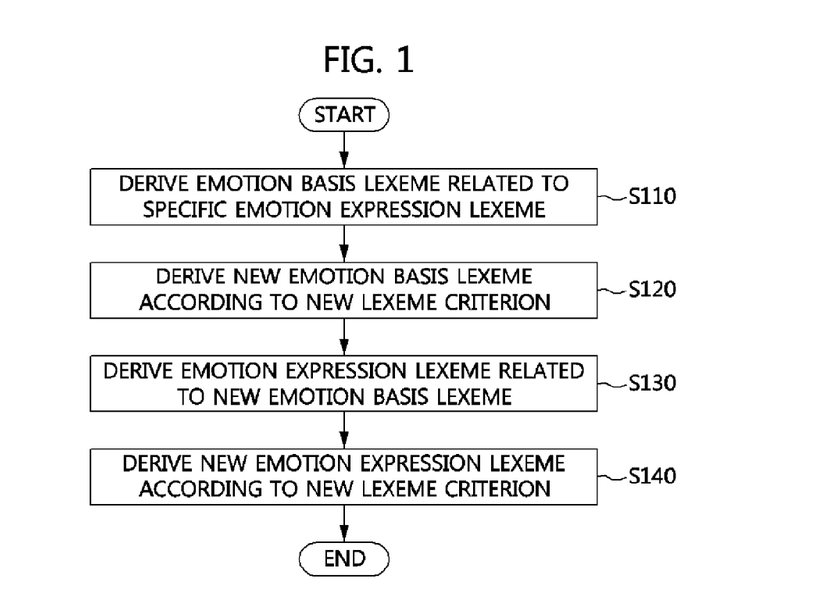
FIG. 1 is a sequence chart for illustrating a process of building information on an emotion lexicon according to an embodiment of the present invention.

FIG. 1 is a sequence chart for illustrating a process of building information on an emotion lexicon according to an embodiment of the present invention.

Referring to FIG. 1, it can be seen that the process of building information on an emotion lexicon according to an embodiment of the present invention includes a step S110 of deriving an emotion basis lexeme related to specific emotion expression lexemes, a step S120 of deriving a new emotion basis, a step S130 of deriving an emotion expression lexeme related to the new emotion basis lexeme, and a step S140 of deriving a new emotion expression lexeme.

Hereinafter, the process of building information on an emotion lexicon according to an embodiment of the present invention will be described in more detail with reference to FIG. 1.

The step S110 of deriving an emotion basis lexeme includes retrieving specific documents on the basis of a specific emotion expression lexeme included in an emotion lexicon and deriving emotion basis lexemes of the emotion expression lexeme from sentences including the emotion expression lexeme. Even in an initial step of building the emotion lexeme, the emotion lexicon may include at least one emotion lexeme to provide a key word for initial retrieval.

The step S120 of deriving a new emotion basis lexeme includes deriving a new emotion basis lexeme, which is determined among the derived emotion basis lexemes according to at least one predefined new lexeme criterion, and storing the new emotion basis lexeme in the emotion lexicon.

In this case, the at least one criterion on a new lexeme may include the number of sentences including the emotion basis lexeme, the number of documents including the emotion basis lexeme, the popularity of a document containing a sentence including the emotion basis lexeme, the recognition of a website containing the sentence including the emotion basis lexeme, and so on. That is, the database may be built with all the retrieved emotion basis lexemes, or only with retrieved emotion basis lexemes that meet a certain criterion in consideration of database storage, etc.

The method of deriving a new emotion basis lexeme according to the new lexeme criterion will be described in more detail later.

To provide more detailed description of the process of deriving a new emotion basis lexeme, the process includes grouping the derived emotion basis lexemes by a certain type, ranking the emotion basis lexeme groups according to at least one new lexeme criterion, extracting emotion basis lexemes from emotion basis lexeme groups above a certain rank, and storing the emotion basis lexemes as the new emotion basis lexeme in the emotion lexicon in correspondence with the specific emotion expression lexeme.

In this case, the grouping may include, for example, classifying emotion basis lexemes having the same meaning into the same group. For example, if "battery is running out," "battery is running out quickly," "battery drains quickly," and "hungry" are retrieved as emotion basis lexemes for "irritated," "battery is running out," "battery is running out fast," and "battery drains fast," which are determined to have similar meanings, may be in the same group.

Furthermore, lexemes in a group with a certain rank, in which the group is ranked, for example, in the top 10 or top 10% among the ranked groups applying the new lexeme criterion described above (for example, retrieval number, site popularity, etc.), are determined to be new emotion basis lexemes and then stored in the emotion lexicon.

The step S130 of deriving an emotion expression lexeme related to the new emotion basis lexeme may include retrieving specific documents from the Web on the basis of the derived new emotion basis lexeme and deriving emotion expression lexemes related to the new emotion basis lexeme from sentences including the new emotion basis lexeme.

The step S140 of deriving a new emotion expression lexeme includes deriving a new emotion expression lexeme, which is determined among the derived emotion expression lexemes according to at least one predefined new lexeme criterion, and storing the new emotion expression lexeme in the emotion lexicon.

For example, the step includes grouping the derived emotion expression lexemes by a certain type, ranking the emotion expression lexeme groups according to at least one new lexeme criterion, extracting emotion expression lexemes from emotion basis lexeme groups above a certain rank, and storing the emotion expression lexemes as the new emotion expression lexemes in the emotion lexicon in correspondence with the emotion basis lexeme.

Hereinafter, the method of building information on an emotion lexicon according to an embodiment of the present invention will be described in more detail.

Figure 2:
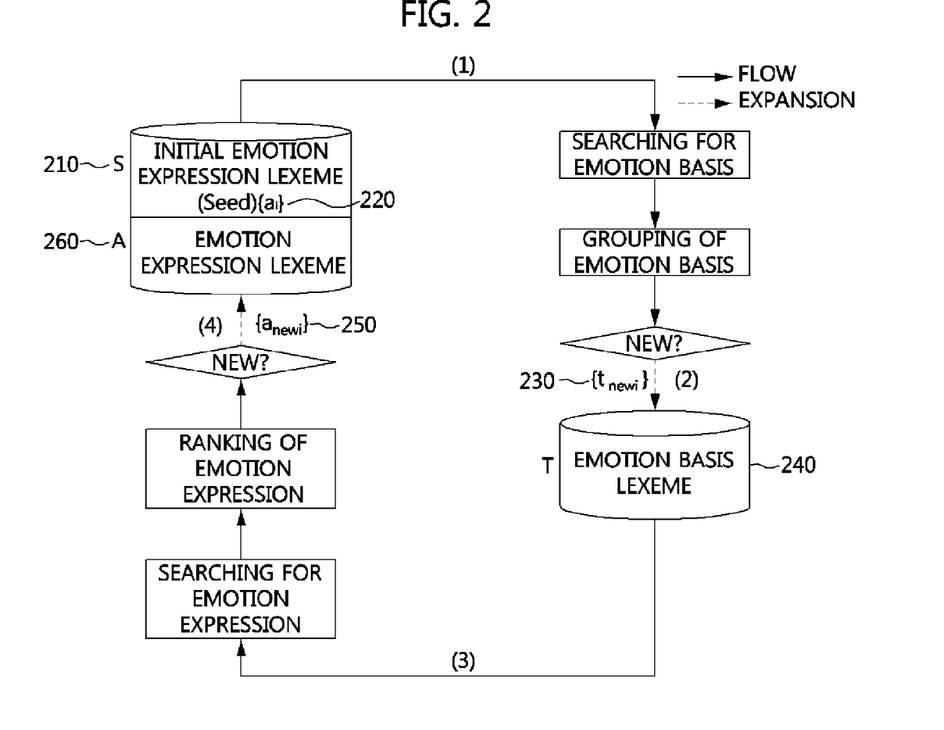
FIG. 2 is a conceptual view for showing a process of building information on an emotion lexicon according to an embodiment of the present invention.

FIG. 2 is a conceptual view for showing a process of building information on an emotion lexicon according to an embodiment of the present invention.

Referring to FIG. 2, the process of building information on an emotion lexicon according to an embodiment of the present invention will be described in more detail as follows.

1) Step of Expanding Emotion Basis Lexeme

The first step is the step of expanding the emotion basis lexeme, which includes searching for web documents (blogs, news, customer reviews, comments, etc.) or social web sentences (Tweets, messenger chats, etc.) having an emotion expression lexeme (Anchor: ai) 220 on the basis of the emotion expression lexeme 220 included in an initial emotion lexeme set (Seed: S) 210 and grouping and ranking an emotion basis lexeme (Trigger: ti) corresponding to the emotion expression lexeme 220 included in the sentence.

The step further includes selecting an emotion basis lexeme {tnew i} 230 above a threshold for determining whether a pattern is new from among the ranked emotion basis lexemes and adding the emotion basis lexeme to the emotion basis lexeme set (T) 240. At this point, the emotion basis lexeme is expanded. Here, the threshold may mean a threshold rank which is set by applying a predetermined criterion to determine whether the lexeme is new as described above.

2) Step of Expanding Emotion Expression Lexeme

The next step is the step of expanding the emotion expression lexeme, which includes searching for web documents or social web sentences having the newly selected emotion basis lexeme 230, deriving emotion expression lexemes related to the emotion basis lexeme 230 from the searched sentence, and grouping and ranking the emotion expression lexemes.

The step further includes selecting an emotion basis lexeme {anew i} 250 above a threshold for determining whether a pattern is new from among the ranked emotion basis lexemes and adding the emotion basis lexeme to the emotion basis lexeme set (A) 260. At this point, the emotion expression lexeme is expanded.

This process is repeated until a new lexeme can no longer be derived, that is, the emotion expression lexeme set (A) 260 or the emotion basis lexeme set (T) 240 cannot be expanded.

Next, an example of the emotion lexicon which is built in the method of building emotion lexeme according to an embodiment of the present invention will be described with reference to drawings.

Figure 3:
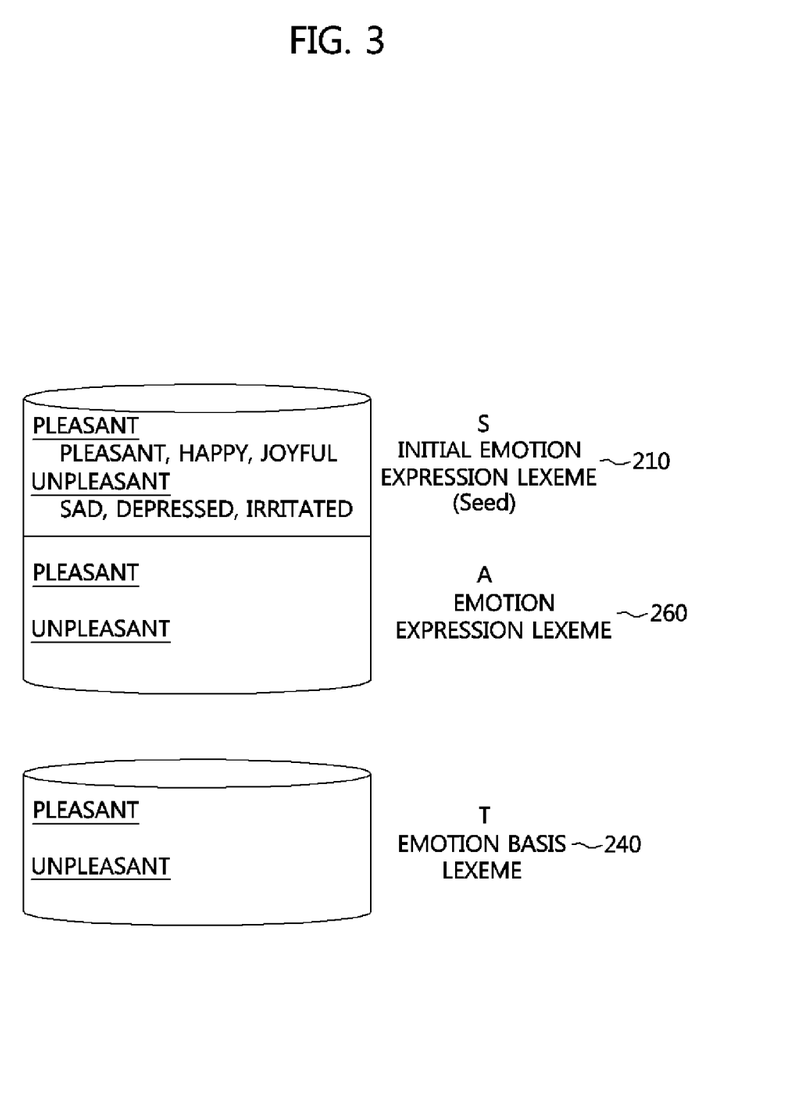
FIG. 3 is a conceptual view for showing an example of initial information on an emotion lexicon according to an embodiment of the present invention.

FIG. 3 shows an example of an initial emotion lexicon according to an embodiment of the present invention.

FIG. 3 illustrates an initial emotion expression lexeme set (S) 210, an emotion expression lexeme set (A) 260, and an emotion basis lexeme set (T) before the step of expanding emotion basis lexeme of FIG. 2 is performed. For example, the initial emotion lexicon includes "pleasant," "happy," and "joyful," which are initial lexemes with the emotion classification of [pleasant] and "sad," "depressed," and "irritated" which are initial lexemes with the emotion classification of [unpleasant].

Figure 4:
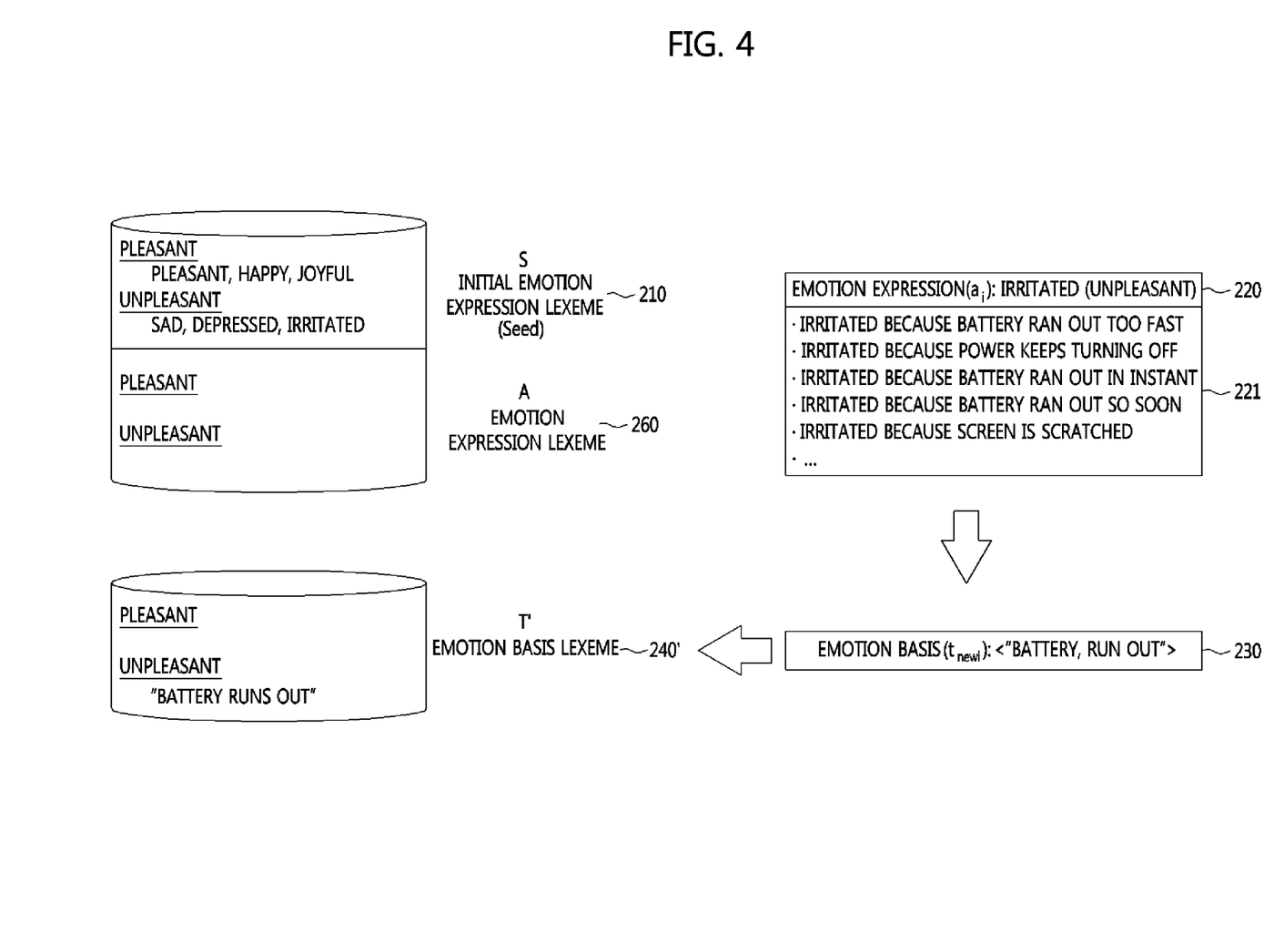
FIG. 4 is a conceptual view for showing a process of collecting an emotion basis lexeme according to an embodiment of the present invention.

FIG. 4 represents a process of collecting emotion basis lexemes according to an embodiment of the present invention, which shows a result of performing the step of expanding the emotion basis lexeme in FIG. 2.

FIG. 4 illustrates a result 240' of searching for sentences 221 having "irritated" which means "unpleasant" among emotion expression lexemes {ai} 220 of the initial emotion expression lexeme set (S) 210 to collect the emotion basis lexemes of the emotion expression lexeme. "Battery has run out" is extracted as an expression above a threshold from emotion basis lexemes collected through grouping by sentence and then added as the new emotion basis lexeme (tnew i) 230 to the emotion basis lexeme set (T) 240.

Figure 5:
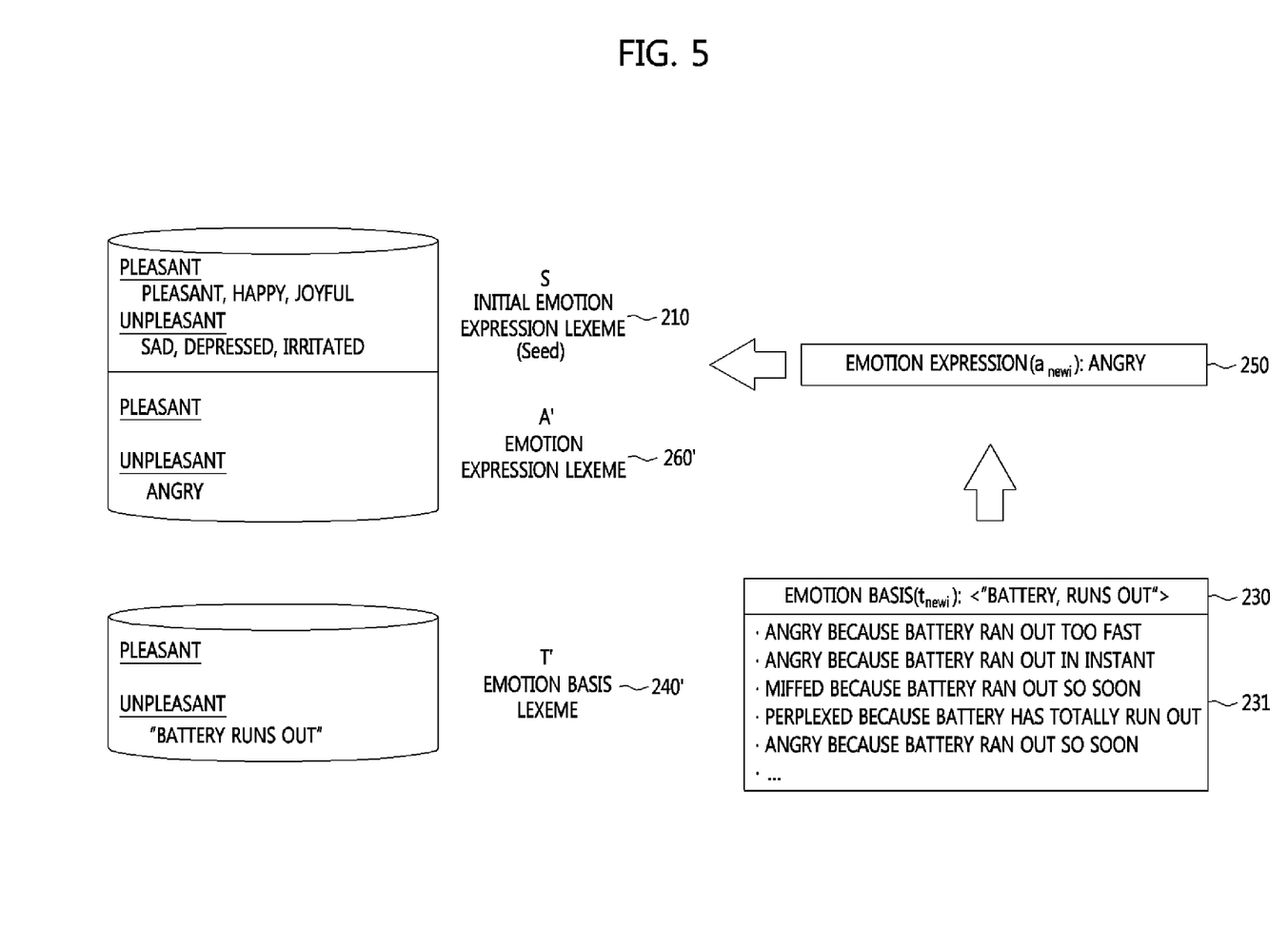
FIG. 5 is a conceptual view for showing a process of collecting an emotion expression lexeme according to an embodiment of the present invention.

FIG. 5 represents a process of collecting an emotion expression lexeme according to an embodiment of the present invention, which shows a result of performing the step of expanding the emotion expression lexeme in FIG. 2.

FIG. 5 illustrates a result 260' of searching for sentences 231 having the new extracted emotion basis lexeme "battery has run out" 230 to collect the emotion expression lexemes corresponding to the emotion basis lexeme. "Get angry" is extracted as an expression above a threshold from emotion expression lexemes collected through grouping by sentence and then added as the new emotion expression lexeme (anew i) 250 to the emotion expression lexeme set (A') 260'.

Referring to FIGS. 3 and 5, as a result of performing the method of building information on an emotion lexicon according to an embodiment of the present invention, it can be seen that the emotion expression lexeme set is expanded from A to A', and the emotion basis lexeme set is expanded from T to T'. This enables a more precise and accurate emotion lexicon to be built through a small amount of manual work, thereby improving efficiency and accuracy of emotion recognition.

3) Process of Assigning Emotion Strength to Emotion Expression Lexeme

Hereinafter, the process of assigning emotion strength to an emotion expression lexeme according to an embodiment of the present invention will be described.

Figure 6:
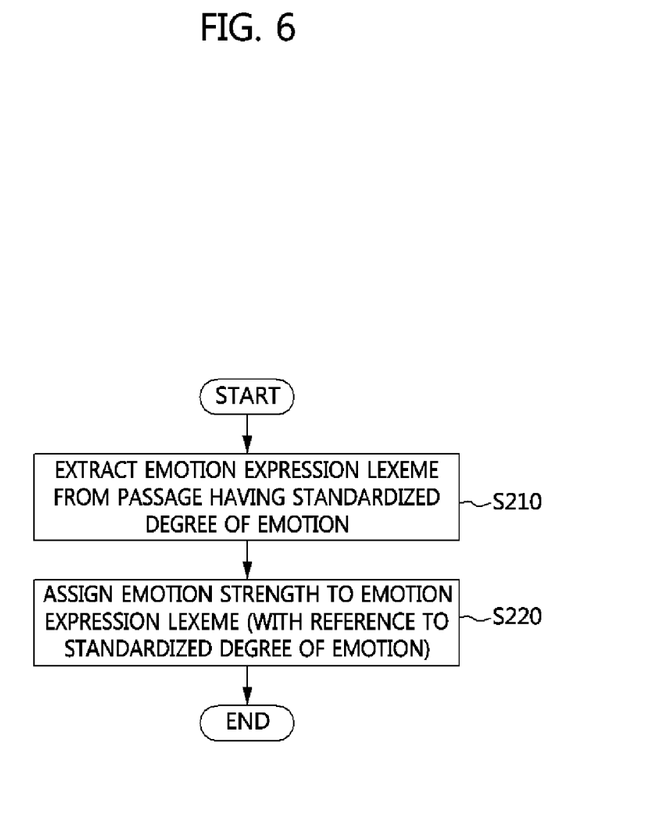
FIG. 6 is a sequence chart for illustrating a process of assigning emotion strength to an emotion expression lexeme according to an embodiment of the present invention.

FIG. 6 is a sequence chart illustrating a process of assigning emotion strength to an emotion expression lexeme according to an embodiment of the present invention.

Referring to FIG. 6, it can be seen that the process of assigning emotion strength to an emotion expression lexeme according to an embodiment of the present invention includes a step S210 of extracting an emotion expression lexeme, which is performed by retrieving passage having a standardized degree of emotion, a step S220 of assigning emotion strength, a step S230 of extracting a modifier, and a step S240 of assigning a weight to the modifier.

Referring to FIG. 6, the process of assigning emotion strength to an emotion expression lexeme according to an embodiment of the present invention will be described as follows.

Step S210 of extracting an emotion expression lexeme includes retrieving a passage in which degree of emotion of a user is standardized and thus digitized from a document for a user's response and extracting the emotion expression lexeme from the written sentence in correspondence with the standardized degree of emotion. In this case, the passage in which the user's degree of emotion is standardized and thus digitized may include, for example, a passage which is selected by a user from among phrases such as "satisfied," "highly satisfied," "average," "dissatisfied," and "highly dissatisfied," which are provided in advance for a user satisfaction survey after product purchase.

The step S220 of assigning emotion strength includes assigning emotion strength to the extracted emotion expression lexeme with reference to the standardized degree of emotion and storing the emotion expression lexeme in the emotion lexicon.

Figure 7:
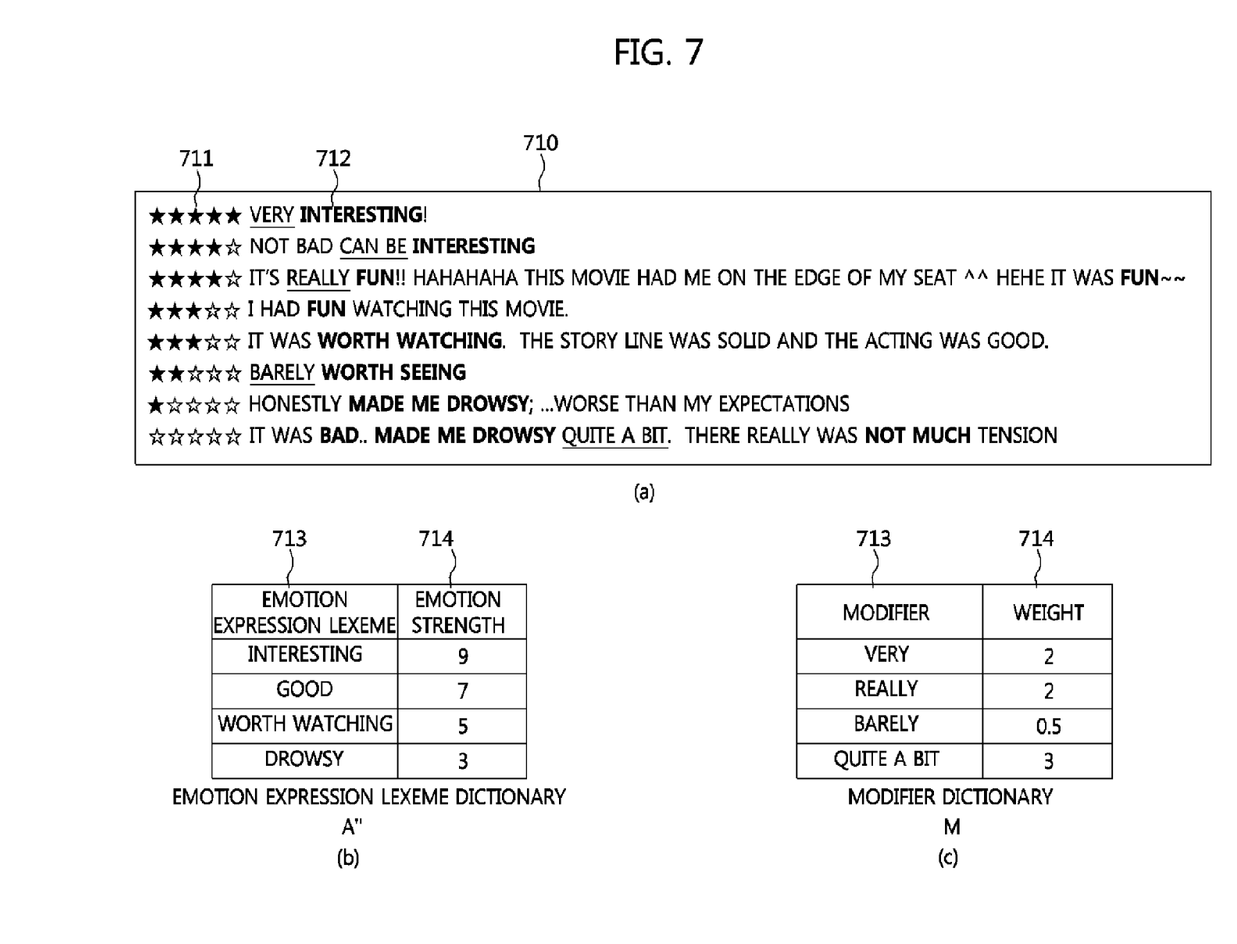
FIG. 7 is a conceptual view for showing an example of assigning emotion strength to an emotion expression lexeme according to an embodiment of the present invention.

FIG. 7 is a conceptual view for showing an example of assigning emotion strength to an emotion expression lexeme according to an embodiment of the present invention.

Referring to FIG. 7a, it can be seen that a user comment 710 includes a standardized rating 711 provided in advance and a sentence 712 which is input by a user.

FIG. 7b illustrates an example of assigning emotion strength to an emotion expression lexeme corresponding to its standardized rating which is assigned by a user, with reference to the standardized rating. Through this process, the emotion expression lexeme dictionary is expanded from A' 240' to A" 240".

Furthermore, the strength may be expanded or reduced through a modifier (Modifier: M) 720 such as an adverb ("very," "quite," "significantly," etc.) in view of characteristics of emotional expression. This may be applied to the following equation. The equation may change in various forms.

$$SentScore(Si) = (\Sigma mi) * SentDegree\_of\_Anchor(Si) \qquad \text{Equation 1}$$

SentScore(Si)=Emotional-expression strength having modifier in sentence mi=Modifier weight (Example: very=2)

SentDegree_of_Anchor(Si)=Emotion strength of emotion expression lexeme (example: fun=7)

That is, referring to FIG. 7, a sentence "It was very interesting," may be estimated to have an emotion strength higher than a sentence "It was just interesting" because an emotion expression lexeme "interesting" has an emotion strength of 9 but a modifier "very" has a weight of 2 while a modifier "just" has a weight of 0.5.

Figure 8:
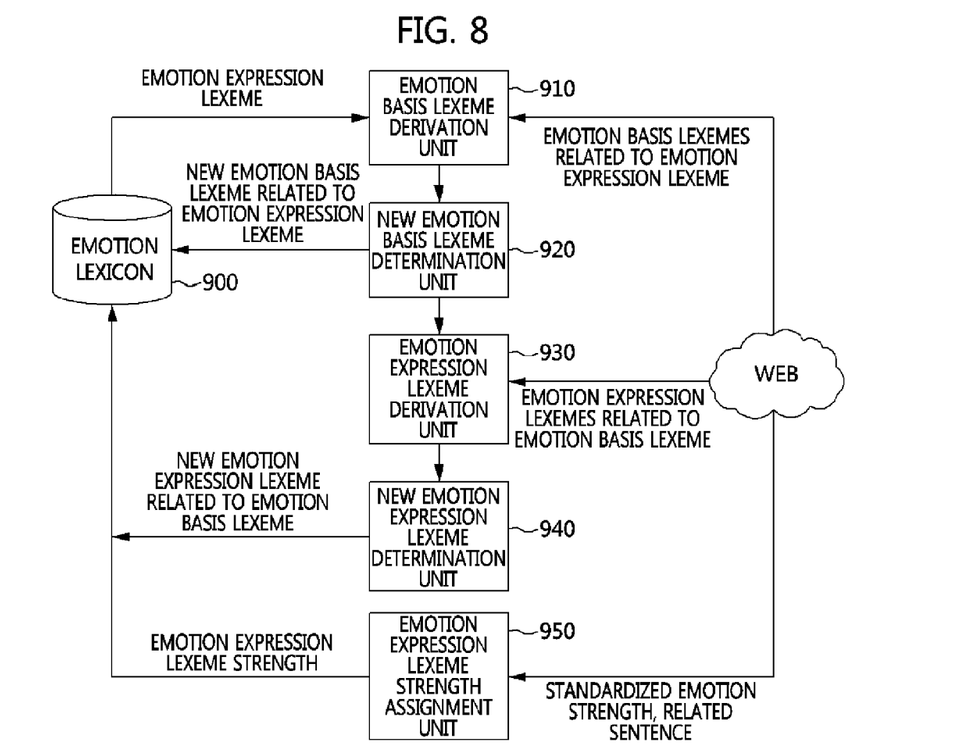
FIG. 8 is a conceptual view for showing an apparatus for building information on an emotion lexicon according to an embodiment of the present invention.

FIG. 8 is a conceptual view for showing an apparatus for building information on an emotion lexicon according to an embodiment of the present invention.

Referring to FIG. 8, it can be seen that the apparatus for building information on an emotional lexicon according to an embodiment of the present invention includes an emotion lexicon 900, an emotion basis lexeme derivation unit 910, a new emotion basis lexeme determination unit 920, an emotion expression lexeme derivation unit 930, a new emotion expression lexeme determination unit 940, and an emotion expression lexeme strength assignment unit 950.

Referring to FIG. 8, the apparatus for building information on an emotion lexicon may be described as follows.

The emotion lexicon 900 includes emotion expression lexemes, emotion basis lexemes corresponding to the emotion expression lexemes, and properties of the emotion expression lexemes such as an emotion strength, thus practically implementing a result of building the information on the emotion lexicon according to the present invention.

The emotion basis lexeme derivation unit 910 retrieves documents on the basis of a specific emotion expression lexeme included in the emotion lexicon and derives emotion basis lexemes of the emotion expression lexeme from sentences including the emotion expression lexeme.

The new emotion basis lexeme determination unit 920 stores a new emotion basis lexeme, which is determined among the derived emotion basis lexemes according to a predefined new lexeme criterion, in the emotion lexicon.

For this, the new emotion basis lexeme determination unit 920 groups the derived emotion basis lexemes by a certain type, ranks the emotion expression lexeme groups according to a new lexeme criterion, extracts emotion basis lexemes from emotion basis lexeme groups above a certain rank, and stores the emotion basis lexemes in the emotion lexicon in correspondence with the emotion expression lexeme.

In this case, the new lexeme criterion may include the number of sentences including the emotion basis lexeme, the number of documents including the emotion basis lexeme, the popularity of a document containing a sentence including the emotion basis lexeme, the recognition of a website containing the sentence including the emotion basis lexeme, and so on.

The emotion expression lexeme derivation unit 930 retrieves a document from the web on the basis of the new emotion basis lexeme which is determined by the new emotion lexeme determination unit 920 and derives emotion expression lexemes related to the emotion basis lexeme from sentences including the emotion basis lexeme.

The new emotion expression lexeme determination unit 940 stores a new emotion expression lexeme, which is determined among the derived emotion expression lexemes according to a predefined new lexeme criterion, in the emotion lexicon.

For this, the new emotion expression lexeme determination unit 940 groups the derived emotion expression lexemes by a certain type, ranks the emotion expression lexeme groups according to a new lexeme criterion, extracts emotion expression lexemes from emotion basis lexeme groups above a certain rank, and stores the emotion expression lexemes in the emotion lexicon in correspondence with the emotion basis lexeme.

In this case, the new lexeme criterion may include the number of sentences including the emotion expression lexeme, the number of documents including the emotion expression lexeme, the popularity of a document containing a sentence including the emotion expression lexeme, the recognition of a web-site containing the sentence including the emotion expression lexeme, and so on.

The emotion expression lexeme strength assignment unit 950 retrieves a passage in which a degree of emotion of a user is standardized and thus digitized, extracts the emotion expression lexeme from the written sentence in correspondence with the standardized degree of emotion, assigns emotion strength to the extracted emotion expression lexeme with reference to the standardized degree of emotion, and stores the emotion expression lexeme in the emotion lexicon.

Next, a process of recognizing emotion in a sentence using an emotion lexicon built according to an embodiment of the present invention will be described.

Figure 9:
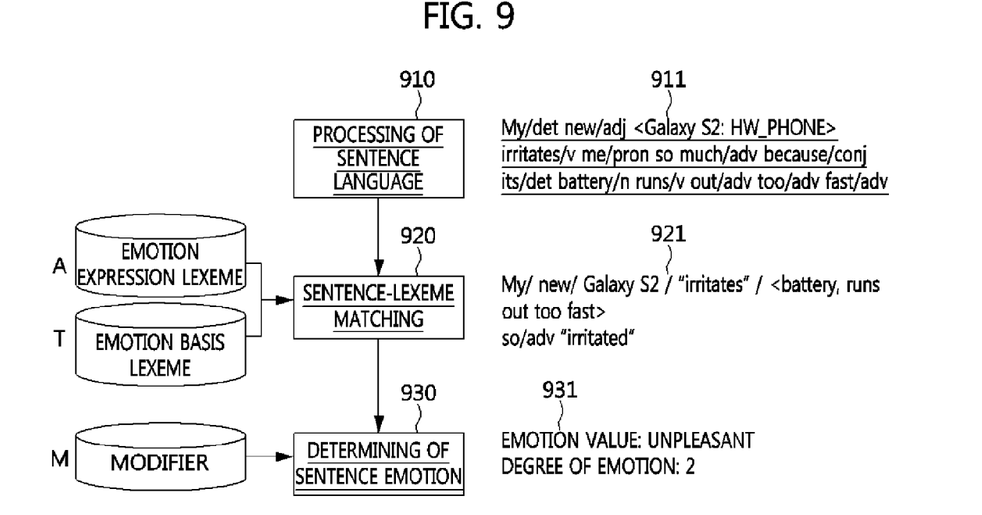
FIG. 9 is a conceptual view for showing a process of recognizing emotion in a sentence using an emotion lexicon according to an embodiment of the present invention.

FIG. 9 is a conceptual view for showing a process of recognizing emotion in a sentence using an emotion lexicon according to an embodiment of the present invention.

Figure 10:
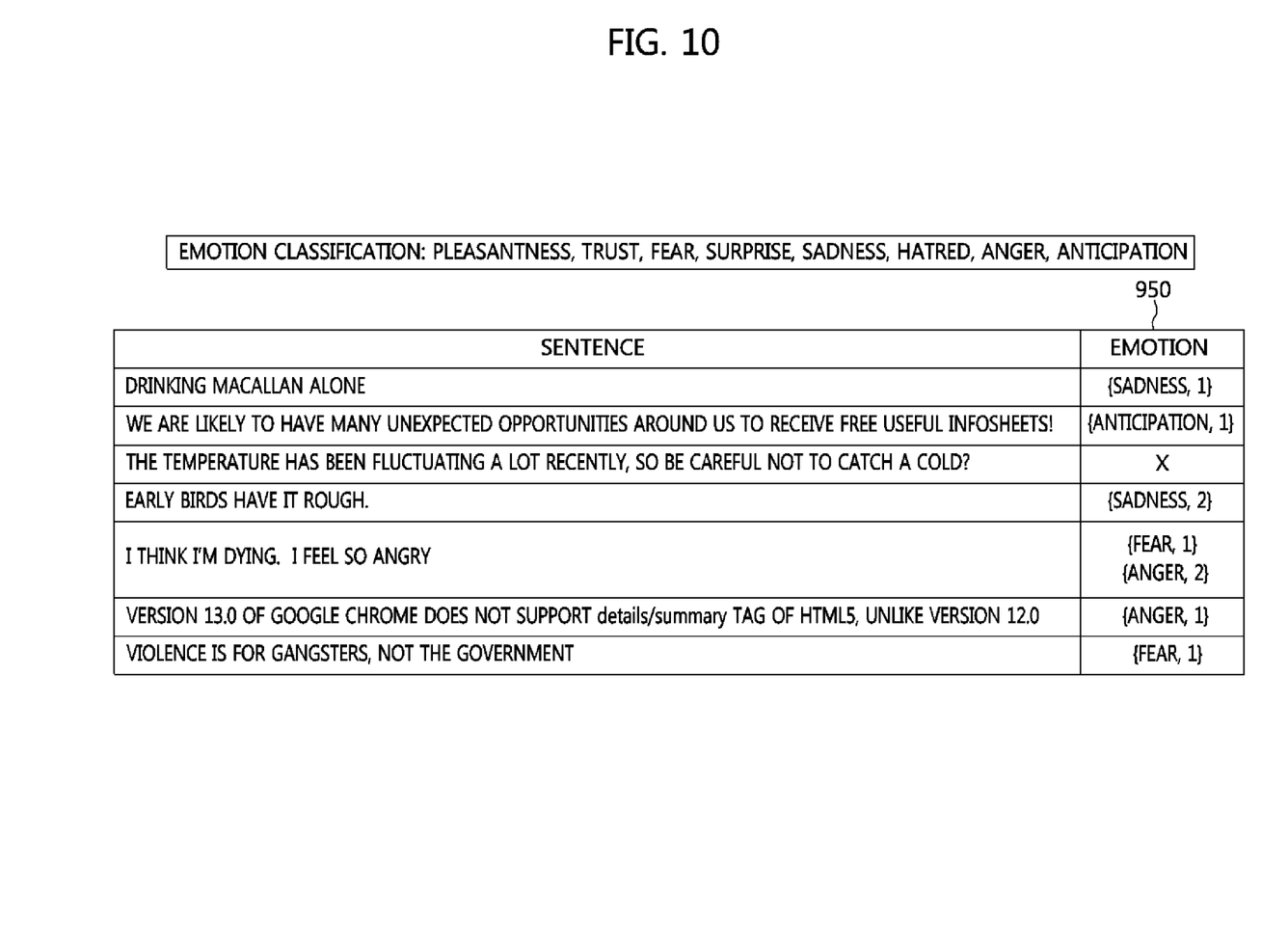
FIG. 10 is a conceptual view for showing a result of recognizing emotion in a sentence using an emotion lexicon according to an embodiment of the present invention.

FIG. 10 is a conceptual view for showing a result of recognizing emotion in a sentence using an emotion lexicon according to an embodiment of the present invention.

Emotion is recognized in a sentence using the emotion lexicon according to an embodiment of the present invention as illustrated in FIG. 9, and digitized like a result 950 that is illustrated in FIG. 10. The process is as follows.

1) Processing of Sentence Language

For example, if an example sentence S1 "My new Galaxy S2 irritates me because its battery runs out too fast" is selected, a sentence language processing module 910, that is, language analysis including morphological analysis, entity name recognition, and chunking, is performed to derive the following result 911.

2) Sentence-Lexeme Matching

Next, sentence-lexeme matching 920 for the above result, that is, an emotion recognition module using the emotion expression lexeme (A) and the emotion basis lexeme (T) in the emotion lexicon, is performed to derive the following analysis result 921.

My/new/Galaxy S2/"irritates"/<battery, runs out too fast>

Emotion expression lexeme="irritates"

Emotion basis lexemes=<battery, runs out>

3) Determining of Sentence Emotion

The determining of sentence emotion 930 for the result, that is, emotion classification and emotion strength, is applied to Equation 1 and calculated to derive the following result 931.

Emotion classification: "irritates"—unpleasant

Emotion strength (SentScore(S1))=weight ("too")*SentDegree_of_Anchor("irritate")=2*1=2

Through the above process, the sample sentence S1 is analyzed to have a final emotion value [unpleasant, 2].

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of building information on an emotion lexeme comprising:

retrieving documents on the web on a basis of an original emotion expression lexeme from a sentence which is input, and deriving emotion basis lexemes of the original emotion expression lexeme from sentences of the retrieved documents including the original emotion expression lexeme;

deriving a new emotion basis lexeme, the new emotion basis lexeme being determined among the emotion basis lexemes according to at least one predefined new lexeme criterion, and then storing the new emotion basis lexeme in a database;

retrieving documents on the web on a basis of the new emotion basis lexeme and then deriving emotion expression lexemes related to the emotion basis lexemes from sentences of the retrieved documents including the new emotion basis lexemes;

deriving a new emotion expression lexeme, the new emotion expression lexeme being determined among the emotion expression lexemes according to at least one predefined new lexeme criterion, and storing the new emotion expression lexeme in the database; and assigning an emotion strength to the new emotion expression lexeme and then storing the emotion strength of the new emotion expression lexeme in the database, wherein the emotion strength is calculated by multiplying an emotion strength value of the new emotion expression lexeme by a sum of weights of a plurality of modifiers.

2. The method of claim 1, wherein the deriving of the new emotion basis lexeme comprises:

grouping the derived emotion basis lexemes for each emotion basis lexeme having the same meaning, thereby generating emotion basis lexeme groups, ranking the emotion basis lexeme groups according to at least one predefined lexeme criterion, extracting emotion basis lexemes from emotion basis lexeme groups above a certain rank, and storing the extracted emotion basis lexemes as the new emotion basis lexemes in the database in correspondence with the specific emotion expression lexeme.

3. The method of claim 1, wherein the deriving of the new emotion expression lexeme comprises:

grouping the derived emotion expression lexemes for each emotion basis lexeme having the same meaning, thereby generating emotion expression lexeme groups, ranking the emotion expression lexeme groups according to at least one predefined lexeme criterion, extracting emotion expression lexemes from emotion expression lexeme groups above a certain rank, and storing the extracted emotion expression lexemes as the new emotion expression lexemes in the database in correspondence with the new emotion basis lexeme.

4. The method of claim 1, wherein each predefined new lexeme criterion comprises at least one of a number of sentences including a lexeme, a number of documents including the lexeme, a popularity of a document containing a sentence including the lexeme, and a recognition of a web-site containing the sentence including the lexeme.

5. An apparatus for building information on an emotion lexeme comprising:

a database including emotion expression lexemes and emotion basis lexemes corresponding to the emotion expression lexemes;

an emotion basis lexeme derivation unit retrieving documents on the web on a basis of an original emotion expression lexeme from a sentence which is input, and deriving emotion basis lexemes of the original emotion expression lexeme from sentences of the documents including the original emotion expression lexeme;

a new emotion basis lexeme determination unit storing a new emotion basis lexeme determined among the emotion basis lexemes according to a predefined new lexeme criterion, in the database;

an emotion expression lexeme derivation unit retrieving a document on the web on a basis of the new emotion basis lexeme and deriving emotion expression lexemes related to the emotion basis lexeme from sentences of the document including the new emotion basis lexeme; and a new emotion expression lexeme determination unit storing a new emotion expression lexeme determined among the emotion expression lexemes according to a predefined new lexeme criterion, in the database, wherein the new emotion expression lexeme determination unit assigns an emotion strength to the new emotion expression lexeme and then stores the emotion strength of the new emotion expression lexeme in the database, and wherein the emotion strength is calculated by multiplying an emotion strength value of the new emotion expression lexeme by a sum of weights of a plurality of modifiers.

6. The apparatus of claim 5, wherein the new emotion basis lexeme determination unit groups the derived emotion basis lexemes for each emotion basis lexeme having the same meaning, thereby generating emotion basis lexeme groups, ranks the emotion basis lexeme groups according to at least one predefined lexeme criterion, extracts emotion basis lexemes from emotion basis lexeme groups above a certain rank, and stores the extracted emotion basis lexemes as the new emotion basis lexemes in the database in correspondence with the emotion expression lexeme.

7. The apparatus of claim 5, wherein the new emotion expression lexeme determination unit groups the derived emotion expression lexemes for each emotion basis lexeme having the same meaning, thereby generating emotion expression lexeme groups, ranks the emotion expression lexeme groups according to at least one predefined lexeme criterion, extracts emotion expression lexemes from emotion expression lexeme groups above a certain rank, and stores the extracted emotion expression lexemes as the new emotion expression lexemes in the database in correspondence with the new emotion basis lexeme.

8. The apparatus of claim 5, wherein each predefined new lexeme criterion comprises at least one of a number of sentences including a lexeme, a number of documents including the lexeme, a popularity of a document containing a sentence including the lexeme, and a recognition of a website containing the sentence including the lexeme.

9. The apparatus of claim 5, further comprising an emotion strength assignment unit retrieving a passage in which a degree of emotion of a user is standardized and thus digitized, extracting the emotion expression lexeme from a written sentence in correspondence with the standardized degree of emotion, assigning an emotional strength to the extracted emotion expression lexeme with reference to the standardized degree of emotion, and storing the emotion expression lexeme in the database, wherein the database further comprises the emotion strength of the emotion expression lexeme being stored as a property.

\* \* \* \* \*